United States Patent
Onishi et al.

(10) Patent No.: US 9,518,169 B2
(45) Date of Patent: *Dec. 13, 2016

(54) POLYLACTIC ACID RESIN COMPOSITION AND RESIN MOLDED ARTICLE THEREOF

(71) Applicants: Hideaki Onishi, Kyoto (JP); Ken Morishita, Kyoto (JP)

(72) Inventors: Hideaki Onishi, Kyoto (JP); Ken Morishita, Kyoto (JP)

(73) Assignee: DAI-ICHI KOGYO SEIYAKU CO., LTD., Kyoto-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,175

(22) Filed: Jan. 22, 2015

(65) Prior Publication Data

US 2015/0225540 A1     Aug. 13, 2015

Related U.S. Application Data

(63) Continuation of application No. 13/711,599, filed on Dec. 11, 2012, now abandoned.

(60) Provisional application No. 61/570,529, filed on Dec. 14, 2011.

(30) Foreign Application Priority Data

Dec. 12, 2011 (JP) .................. 2011-271594

(51) Int. Cl.
| | |
|---|---|
| *C08K 5/20* | (2006.01) |
| *C08K 5/09* | (2006.01) |
| *C08K 5/103* | (2006.01) |
| *C08L 67/04* | (2006.01) |
| *C08K 5/11* | (2006.01) |

(52) U.S. Cl.
CPC . *C08K 5/20* (2013.01); *C08K 5/09* (2013.01); *C08K 5/103* (2013.01); *C08K 5/11* (2013.01); *C08L 67/04* (2013.01)

(58) Field of Classification Search
CPC ............ C08K 5/20; C08K 5/103; C08K 5/11; C08K 5/09; C08L 67/04
See application file for complete search history.

(56) References Cited

U.S. PATENT DOCUMENTS

| | | | |
|---|---|---|---|
| 5,641,502 A | 6/1997 | Skalla et al. | |
| 6,573,340 B1 | 6/2003 | Khemani et al. | |
| 8,900,698 B2 | 12/2014 | Tabata et al. | |
| 2002/0107147 A1* | 8/2002 | Hayashi | A01N 31/02 504/116.1 |
| 2008/0153940 A1 | 6/2008 | Scheer et al. | |
| 2008/0262150 A1 | 10/2008 | Takenaka et al. | |
| 2010/0130065 A1 | 5/2010 | Teague | |
| 2010/0201037 A1 | 8/2010 | Takenaka et al. | |
| 2012/0029112 A1 | 2/2012 | Stefanisin et al. | |
| 2012/0296017 A1 | 11/2012 | Tsuboi et al. | |
| 2013/0150505 A1 | 6/2013 | Onishi et al. | |
| 2013/0150510 A1 | 6/2013 | Onishi et al. | |
| 2014/0296399 A1 | 10/2014 | Tsuboi et al. | |

FOREIGN PATENT DOCUMENTS

| | | |
|---|---|---|
| CN | 101768345 A | 7/2010 |
| CN | 101801636 A | 8/2010 |
| CN | 102753621 A | 10/2012 |
| JP | 2006-083315 A | 3/2006 |
| JP | 2007130895 A | 5/2007 |
| JP | 2007-246624 A | 9/2007 |
| JP | 2008-031375 A | 2/2008 |
| JP | 2008-150492 A | 7/2008 |
| JP | 2009-024081 A | 2/2009 |
| JP | 2009-24081 A | 2/2009 |
| JP | 2011-208042 A | 10/2011 |
| WO | 2008/010318 A1 | 1/2008 |
| WO | 2008075775 A1 | 6/2008 |
| WO | 2012-014670 A1 | 2/2012 |

OTHER PUBLICATIONS

Rheodol TW-IS399C MSDS Kao Corporation. Jan. 7, 2009.*
Extended European Search Report for EP 12195688.2-1302 dated Mar. 15, 2013.
Extended European Search Report for EP 12194691.6-1302 dated Apr. 23, 2013.
Extended European Search Report for EP 12195694.0-1301 dated Dec. 4, 2013.
Bruce A. Kennedy, et al.; Surface Mining 2nd Edition; Society for Mining, Mettalurgy, and Exploration; Mar. 1, 1990; pp. 131-133.
Notification of Transmittal of Translation of the International Preliminary Report on Patentability (Form PCT/IB/338) of International Application No. PCT/JP2013/080484 mailed Jun. 25, 2015 with Forms PCT/IB/373 and PCT/ISA/237 (7 pages).
Non-Final Office Action dated Jan. 26, 2015, issued in U.S. Appl. No. 14/103,553 (18 pages).
Final Office Action dated Jun. 25, 2015, issued in U.S. Appl. No. 14/103,553 (5 pages).
Li et al., "Flame-retardancy and anti-dripping effects of intumescent flame retardant incorporating montmorillonite on poly(lactic acid)," Polymer for Advanced Technologies, vol. 20, Issues 12, Dec. 2008, abstract.

* cited by examiner

*Primary Examiner* — John Uselding
(74) *Attorney, Agent, or Firm* — Westerman, Hattori, Daniels & Adrian, LLP

(57) ABSTRACT

Provided are a polylactic acid resin composition excellent in impact resistance, migration resistance, and heat resistance, and excellent in productivity at the time of the mold forming thereof, and a resin molded article thereof. The polylactic acid resin composition includes a polylactic acid; a reaction product of at least one of a polyol and a polyol dehydration condensate, an alkylene oxide mainly formed of ethylene oxide, and a fatty acid having 12 to 24 carbon atoms; and a fatty acid amide.

8 Claims, No Drawings

POLYLACTIC ACID RESIN COMPOSITION AND RESIN MOLDED ARTICLE THEREOF

CROSS-REFERENCE TO RELATED APPLICATIONS

This application claims the benefit of U.S. patent application Ser. No. 13/711,599 filed on Dec. 11, 2012, U.S. Provisional Application No. 61/570,529 filed on Dec. 14, 2011, and Japanese Application No. JP2011-271594 filed on Dec. 12, 2011, the complete disclosures of which, in their entireties, are hereby incorporated by reference.

BACKGROUND

Technical Field

The embodiments herein relate to a polylactic acid resin composition and a resin molded article thereof.

Description of the Related Art

While depletion of petroleum resources, a $CO_2$ reduction, and the like have been perceived as problems, a polylactic acid using lactic acid obtained by fermenting a grain resource such as corn as a raw material has been attracting attention. Polylactic acid is a resin derived from a plant as described above and has the following characteristics: Polylactic acid has high rigidity, and is excellent in transparency. However, its applications have been limited as compared to an ordinary resin because of, for example, the following reasons: Polylactic acid has low heat resistance and low impact resistance, and hence typically cannot be used under a high-temperature condition.

Available as a method of improving the heat resistance of the polylactic acid is, for example, a method involving increasing its crystallinity through a heat treatment (annealing treatment). However, the method involves, for example, the following problems. The method is not practical owing to an extremely long heat treatment time and transparency of the polylactic acid reduces in association with progress of its crystallization.

In view of the foregoing, blending of various plasticizers and crystal nucleating agents into a resin composition using the polylactic acid as a polymer has been investigated as a method of solving those problems in recent years.

For example, the following has been proposed as an example of the blending (Internationalt Publication No. WO2008/010318A). A fatty acid ester formed of a dehydration condensate of a sugar alcohol and a fatty acid is used as the plasticizer, and a layered silicate is used as the crystal nucleating agent.

In addition to the foregoing, for example, the following has been proposed (Japanese Patent Application Laid-open No. JP-A-2007-130895). A saturated ester is used as the plasticizer and an aliphatic ester or a fatty acid amide is used as the crystal nucleating agent.

However, generally the applications where the resin composition disclosed in WO2008/010318A can be used are extremely limited owing to its low heat resistance. Moreover, the resin composition involves a problem in that productivity at the time of its mold forming is poor because a molded article thereof is liable to deform upon its removal from the mold unless a molding time during the mold forming is set to be long.

On the other hand, the impact resistance of the resin composition disclosed in JP-A-2007-130895 has been somewhat improved. However, a molded article excellent in impact resistance and migration resistance typically cannot be obtained from the resin composition because the resin composition is liable to be migrated in water or an alcohol. Further, the resin composition still has room for improvement because its productivity at the time of the mold forming thereof is not sufficient.

Accordingly, it would be desirable to provide a polylactic acid resin composition excellent in impact resistance, migration resistance, and heat resistance, and excellent in productivity at the time of the mold forming thereof, and a resin molded article thereof.

SUMMARY

In view of the foregoing, an embodiment herein provides a polylactic acid resin composition, including: the following components (A) a polylactic acid; (B) a reaction product of at least one of a polyol and a polyol dehydration condensate, an alkylene oxide mainly formed of ethylene oxide, and a fatty acid having 12 to 24 carbon atoms; and (C) a fatty acid amide.

Another embodiment provides a resin molded article formed of the polylactic acid resin composition of the first gist.

The inventors of the present invention have made extensive studies to obtain a polylactic acid resin composition excellent in impact resistance, migration resistance, and heat resistance, and excellent in productivity at the time of the mold forming thereof. As a result, the inventors of the present invention have found that the desired object can be achieved by the following procedure. A specific reaction product, i.e., the reaction product (component B) of at least one of the polyol and the polyol dehydration condensate, the alkylene oxide mainly formed of ethylene oxide, and the fatty acid having 12 to 24 carbon atoms is blended as a plasticizer into a resin composition using a polylactic acid as a polymer, and the fatty acid amide (component C) is further blended as a crystal nucleating agent into the composition.

As described above, the polylactic acid resin composition of the present invention contains the polylactic acid (component A), the reaction product (component B) of at least one of the polyol and the polyol dehydration condensate, the alkylene oxide mainly formed of ethylene oxide, and the fatty acid having 12 to 24 carbon atoms, and the fatty acid amide (component C). Therefore, the composition is excellent in impact resistance, migration resistance, and heat resistance, and can exert an excellent effect on its productivity at the time of the mold forming (a resin molded article thereof can be efficiently obtained within a short time period without the occurrence of the deformation at the time of its removal from the mold). In addition, the composition exerts the following effect. The composition eliminates the need for countermeasures against high temperatures at the time of, for example, its transportation because the composition is excellent in heat resistance and the like.

In particular, when the reaction product as the component B contains an oxyethylene group in a specific range, the polylactic acid resin composition of the present invention and the resin molded article thereof each become excellent in transparency, productivity at the time of molding, and the like.

Further, when the polyol as a material for the reaction product as the component (B) is a specific polyol such as glycerin, erythritol, pentaerythritol, xylitol, sorbitol, mannitol, galactitol, or maltitol, the polylactic acid resin composition of the present invention and the resin molded article thereof each become additionally excellent in impact resistance and the like.

In addition, when the content of the reaction product as the component B falls within a specific range, the polylactic acid resin composition of the present invention and the resin molded article thereof each become additionally excellent in impact resistance and the like.

In addition, when the content of the fatty acid amide as the component C falls within a specific range, the polylactic acid resin composition of the present invention and the resin molded article thereof each become additionally excellent in productivity at the time of molding and the like.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

According to the embodiments herein, the polylactic acid resin composition contains the polylactic acid (component A), the reaction product (component B) of at least one of the polyol and the polyol dehydration condensate, the alkylene oxide mainly formed of ethylene oxide, and the fatty acid having 12 to 24 carbon atoms, and the fatty acid amide (component C). In the polylactic acid resin composition of the present invention, the reaction product as the component (B) typically has an action as a plasticizer and the fatty acid amide as the component (C) has an action as a crystal nucleating agent. It should be noted that the polylactic acid resin composition of the present invention can contain, for example, a resin except the polylactic acid, an inorganic filler, a hydrolysis inhibitor, an impact modifier, or an antioxidant in addition to the above-mentioned components as required.

Polylactic Acid

The polylactic acid (component A) in the polylactic acid resin composition of the present invention refers to both of a polylactic acid obtained by subjecting only lactic acid as a raw material monomer to condensation polymerization, and a polylactic acid obtained by subjecting a lactic acid component and a hydroxycarboxylic acid component except lactic acid (hereinafter, sometimes simply referred to as "hydroxycarboxylic acid component") as raw material monomers to condensation polymerization.

Optical isomers, i.e., L-lactic acid (L-form) and D-lactic acid (D-form) exist for lactic acid. Although only one of the optical isomers may, or both the isomers may each, be incorporated as a lactic acid component in the present invention, lactic acid having a high optical purity, the lactic acid using one of the optical isomers as a main component, is preferably used from the viewpoints of: the achievement of compatibility between the flexibility of the polylactic acid resin composition, and its rigidity and heat resistance; and productivity at the time of molding. It should be noted that the term "main component" as used herein refers to a component whose content in the lactic acid component is 80 mol % or more.

The content of the L-form or the D-form in the lactic acid component, i.e., the content of the more abundant one of the isomers in the case where only the lactic acid component is subjected to condensation polymerization is preferably 95.0 mol % or more, more preferably 98 mol % or more from the above-mentioned viewpoints.

The content of the L-form or the D-form in the lactic acid component, i.e., the content of the more abundant one of the isomers in the case where the lactic acid component and the hydroxycarboxylic acid component are subjected to condensation polymerization is preferably 95.0 mol % or more, more preferably 98 mol % or more from the above-mentioned viewpoints.

In addition to a product obtained by subjecting only the D-form as lactic acid to condensation polymerization, a product obtained by subjecting only the L-form as lactic acid to condensation polymerization, and a product obtained by copolymerizing the D-form and the L-form, a product obtained by blending a polylactic acid using the L-form as a main component and a polylactic acid using the D-form as a main component at arbitrary ratios may also be used as the polylactic acid.

On the other hand, examples of the hydroxycarboxylic acid component except lactic acid include hydroxycarboxylic acid compounds such as glycolic acid, hydroxybutyric acid, hydroxyvaleric acid, hydroxypentanoic acid, hydroxycaproic acid, and hydroxyheptanoic acid. One kind of those hydroxycarboxylic acid components is used alone, or two or more kinds thereof are used in combination. Of those, glycolic acid and hydroxycaproic acid are preferred.

In addition, in the present invention, dimers of lactic acid and the hydroxycarboxylic acid compound may be incorporated into each component. For example, a lactide as a cyclic dimer of lactic acid is used as the dimer of lactic acid, and for example, glycolide as a cyclic dimer of glycolic acid is used as the dimer of the hydroxycarboxylic acid compound. It should be noted that the lactides are classified into an L-lactide as a cyclic dimer of L-lactic acid, a D-lactide as a cyclic dimer of D-lactic acid, a meso-lactide obtained by the cyclic dimerization of D-lactic acid and L-lactic acid, and a DL-lactide as a racemic mixture of the D-lactide and the L-lactide. Although each of the lactides can be used in the present invention, the D-lactide and the L-lactide are preferred from the viewpoints of the flexibility and rigidity of the polylactic acid resin composition, and productivity at the time of the molding of the polylactic acid resin. It should be noted that the dimer of lactic acid may be incorporated into the lactic acid component in each of the case where only the lactic acid component is subjected to condensation polymerization, and the case where the lactic acid component and the hydroxycarboxylic acid component are subjected to condensation polymerization.

The condensation polymerization reaction of only the lactic acid component, and the condensation polymerization reaction of the lactic acid component and the hydroxycarboxylic acid component are not particularly limited, and can each be performed by employing a known method.

In addition, the weight-average molecular weight of the polylactic acid in the present invention falls within the range of typically 10,000 to 400,000, preferably 50,000 to 400,000. The weight-average molecular weight more preferably falls within the range of 100,000 to 300,000. That is because of the following reasons. When the weight-average molecular weight of the polylactic acid falls short of the range, the mechanical properties of a resin molded article are low. In contrast, when the weight-average molecular weight of the polylactic acid outstrips the range, the polylactic acid becomes poor in flowability at the time of the molding thereof. It should be noted that the weight-average molecular weight of the polylactic acid can be determined in terms of styrene having a known molecular weight as a reference by using a gel permeation chromatograph (GPC), chloroform as a solvent, a high-temperature SEC column (GMHHR-H series) manufactured by TOSOH CORPORATION as a column with its flow rate and column temperature set to 1.0 mL/min and 40° C., respectively, and a refractive index detector (RI) as a detector.

Plasticizer

The reaction product (component B) of at least one of the polyol and the polyol dehydration condensate, the alkylene oxide mainly formed of ethylene oxide, and the fatty acid having 12 to 24 carbon atoms is used as the plasticizer in the polylactic acid resin composition of the present invention. The term "alkylene oxide mainly formed of ethylene oxide" indicates that ethylene oxide accounts for over half of the alkylene oxide and is intended to encompass an alkylene oxide entirely formed of ethylene oxide. It should be noted that, when an alkylene oxide except ethylene oxide is used in combination with ethylene oxide as the alkylene oxides, for example, propylene oxide, butylene oxide, or isobutylene oxide is used in combination.

Further, the polyol as a material for the reaction product as the component (B) is not particularly limited. From the viewpoints of impact resistance and the like, glycerin, erythritol, pentaerythritol, xylitol, sorbitol, mannitol, galactitol, maltitol, or the like is preferably used.

A method of producing the reaction product (component B) is, for example, a method involving: causing the polyol and the fatty acid to react with each other under heating to esterify the polyol; and subjecting ethylene oxide to an addition reaction with the resultant under heating in an autoclave to provide the reaction product (component B). Alternatively, after the polyol dehydration condensate and the fatty acid have been caused to react with each other so that the condensate may be esterified, ethylene oxide may be added to the resultant in the same manner as in the above-mentioned method. Alternatively, after ethylene oxide has been added to the polyol and the polyol dehydration condensate, the fatty acid may be caused to react with the resultant. Also available is, for example, a method involving: synthesizing a fatty acid ester from the fatty acid and a monohydric alcohol having a small number of carbon atoms (methanol or ethanol) in advance; subjecting the ester to an ester exchange reaction with the polyol and the polyol dehydration condensate; and adding ethylene oxide to the resultant in the same manner as in the above-mentioned method to provide the reaction product (component B). In the polylactic acid resin composition of the present invention, one kind of the reaction products (components B) thus obtained is used alone, or two or more kinds thereof are used in combination.

In addition, the content of an oxyethylene group in the reaction product (component B) is preferably 20 to 95 wt %, more preferably 30 to 95 wt % from such a viewpoint that the polylactic acid resin composition of the present invention is excellent in transparency and impact resistance.

In addition, the reaction product (component B) may be each of a saturated ester obtained by esterifying all the hydroxyl groups of the polyol and the polyol dehydration condensate with the fatty acid, and a partial ester obtained by esterifying part of the hydroxyl groups.

In addition, the reaction product (component B) has preferably in excess of 2 (more than 2) and 9 or less, more preferably in excess of 2.5 (more than 2.5) and 6 or less ester groups on average in a molecule thereof from the viewpoint of the impact resistance.

The fatty acid having 12 to 24 carbon atoms is used in the synthesis of the reaction product (component B) and a fatty acid having 14 to 24 carbon atoms is preferably used from such a viewpoint that the polylactic acid resin composition of the present invention is excellent in impact resistance, and in migration resistance for water and an alcohol-based solvent. That is because of the following reasons. When the number of carbon atoms in the fatty acid falls short of the range, desired impact resistance is hardly obtained. Further, the amount of the composition to be migrated in water or the alcohol-based solvent increases. In contrast, when the number of carbon atoms in the fatty acid outstrips the range, the composition has bad compatibility with the polylactic acid (A) as a polymer and is poor in transparency. It should be noted that a fatty acid corresponding to any one of a saturated fatty acid and an unsaturated fatty acid may be used as the fatty acid, and the fatty acids may be used in combination. Alternatively, the fatty acid may be a mixture of fatty acids transformed from oils and fats. In that case, a mixture whose average number of carbon atoms falls within the range is used.

In addition, specific examples of the reaction product (component B) include a polyoxyethylene glycerin laurate, a polyoxyethylene glycerin cocoate, a polyoxyethylene glycerin myristate, a polyoxyethylene glycerin palmitate, a polyoxyethylene glycerin linoleate, a polyoxyethylene glycerin stearate, a polyoxyethylene glycerin isostearate, a polyoxyethylene glycerin-12-hydroxystearate, a polyoxyethylene glycerin oleate, a polyoxyethylene glycerin eicosanoate, a polyoxyethylene glycerin behenate, a polyoxyethylene glycerin lignocerate, a polyoxyethylene erythritol laurate, a polyoxyethylene erythritol cocoate, a polyoxyethylene erythritol myristate, a polyoxyethylene erythritol palmitate, a polyoxyethylene erythritol linoleate, a polyoxyethylene erythritol stearate, a polyoxyethylene erythritol isostearate, a polyoxyethylene erythritol-12-hydroxystearate, a polyoxyethylene erythritol oleate, a polyoxyethylene erythritol eicosanoate, a polyoxyethylene erythritol behenate, a polyoxyethylene erythritol lignocerate, a polyoxyethylene anhydroerythritol laurate, a polyoxyethylene anhydroerythritol cocoate, a polyoxyethylene anhydroerythritol myristate, a polyoxyethylene anhydroerythritol palmitate, a polyoxyethylene anhydroerythritol linoleate, a polyoxyethylene anhydroerythritol stearate, a polyoxyethylene anhydroerythritol isostearate, a polyoxyethylene anhydroerythritol-12-hydroxystearate, a polyoxyethylene anhydroerythritol oleate, a polyoxyethylene anhydroerythritol eicosanoate, a polyoxyethylene anhydroerythritol behenate, a polyoxyethylene anhydroerythritol lignocerate, a polyoxyethylene sorbitol laurate, a polyoxyethylene sorbitol cocoate, a polyoxyethylene sorbitol myristate, a polyoxyethylene sorbitol palmitate, a polyoxyethylene sorbitol linoleate, a polyoxyethylene sorbitol stearate, a polyoxyethylene sorbitol isostearate, a polyoxyethylene sorbitol-12-hydroxystearate, a polyoxyethylene sorbitol oleate, a polyoxyethylene sorbitol eicosanoate, a polyoxyethylene sorbitol behenate, a polyoxyethylene sorbitol lignocerate, a polyoxyethylene sorbitan laurate, a polyoxyethylene sorbitan cocoate, a polyoxyethylene sorbitan myristate, a polyoxyethylene sorbitan palmitate, a polyoxyethylene sorbitan linoleate, a polyoxyethylene sorbitan stearate, a polyoxyethylene sorbitan isostearate, a polyoxyethylene sorbitan-12-hydroxystearate, a polyoxyethylene sorbitan oleate, a polyoxyethylene sorbitan eicosanoate, a polyoxyethylene sorbitan behenate, a polyoxyethylene sorbitan lignocerate, a polyoxyethylene isosorbide laurate, a polyoxyethylene isosorbide cocoate, a polyoxyethylene isosorbide myristate, a polyoxyethylene isosorbide palmitate, a polyoxyethylene isosorbide linoleate, a polyoxyethylene isosorbide stearate, a polyoxyethylene isosorbide isostearate, a polyoxyethylene isosorbide-12-hydroxystearate, a polyoxyethylene isosorbide oleate, a polyoxyethylene isosorbide eicosanoate, a polyoxyethylene isosorbide behenate, a polyoxyethylene isosorbide lignocerate, a polyoxyethylene mannitol laurate, a polyoxyethylene mannitol cocoate, a polyoxyethylene mannitol myristate, a polyoxyethylene mannitol palmitate, a polyoxyethylene mannitol linoleate, a polyoxyethylene mannitol stearate, a polyoxyethylene mannitol isostearate, a polyoxyethylene mannitol-12-hydroxystearate, a polyoxyethylene mannitol oleate, a polyoxyethylene mannitol eicosanoate, a polyoxyethylene mannitol behenate, a polyoxyethylene mannitol lignocerate, a polyoxyethylene mannitan laurate, a polyoxyethylene mannitan cocoate, a polyoxyethylene mannitan myristate, a polyoxyethylene mannitan palmitate, a polyoxyethylene mannitan linoleate, a polyoxyethylene mannitan stearate, a polyoxyethylene mannitan isostearate, a polyoxyethylene mannitan-12-hydroxystearate, a polyoxyethylene mannitan oleate, a polyoxyethylene mannitan eicosanoate, a polyoxyethylene mannitan behenate, a polyoxyethylene mannitan lignocerate, a polyoxyethylene isomannide laurate, a polyoxyethylene isomannide cocoate, a polyoxyethylene isomannide myristate, a polyoxyethylene isomannide palmitate, a polyoxyethylene isomannide linoleate, a polyoxyethylene isomannide stearate, a polyoxyethylene isomannide isostearate, a polyoxyethylene isomannide-12-hydroxystearate, a polyoxyethylene isomannide oleate, a polyoxyethylene isomannide eicosanoate, a polyoxyethylene isomannide behenate, a polyoxyethylene isomannide lignocerate, a polyoxyethylene xylitol laurate, a polyoxyethylene xylitol cocoate, a polyoxyethylene xylitol myristate, a polyoxyethylene xylitol palmitate, a polyoxyethylene xylitol linoleate, a polyoxyethylene xylitol stearate, a polyoxyethylene xylitol isostearate, a polyoxyethylene xylitol-12-hydroxystearate, a polyoxyethylene xylitol oleate, a polyoxyethylene xylitol eicosanoate, a polyoxyethylene xylitol behenate, a polyoxyethylene xylitol lignocerate, a polyoxyethylene anhydroxylitol laurate, a polyoxyethylene anhydroxylitol cocoate, a polyoxyethylene anhydroxylitol myristate, a polyoxyethylene anhydroxylitol palmitate, a polyoxyethylene anhydroxylitol linoleate, a polyoxyethylene anhydroxylitol stearate, a polyoxyethylene anhydroxylitol isostearate, a polyoxyethylene anhydroxylitol-12-hydroxystearate, a polyoxyethylene anhydroxylitol oleate, a polyoxyethylene anhydroxylitol eicosanoate, a polyoxyethylene anhydroxylitol behenate, a polyoxyethylene anhydroxylitol lignocerate, a polyoxyethylene maltitol laurate, a polyoxyethylene maltitol cocoate, a polyoxyethylene maltitol myristate, a polyoxyethylene maltitol palmitate, a polyoxyethylene maltitol linoleate, a polyoxyethylene maltitol stearate, a polyoxyethylene maltitol isostearate, a polyoxyethylene maltitol-12-hydroxystearate, a polyoxyethylene maltitol oleate, a polyoxyethylene maltitol eicosanoate, a polyoxyethylene maltitol behenate, a polyoxyethylene maltitol lignocerate, a polyoxyethylene anhydromaltitol laurate, a polyoxyethylene anhydromaltitol cocoate, a polyoxyethylene anhydromaltitol myristate, a polyoxyethylene anhydromaltitol palmitate, a polyoxyethylene anhydromaltitol linoleate, a polyoxyethylene anhydromaltitol stearate, a polyoxyethylene anhydromaltitol isostearate, a polyoxyethylene anhydromaltitol-12-hydroxystearate, a polyoxyethylene anhydromaltitol oleate, a polyoxyethylene anhydromaltitol eicosanoate, a polyoxyethylene anhydromaltitol behenate, a polyoxyethylene anhydromaltitol lignocerate, a polyoxyethylene galactitol laurate, a polyoxyethylene galactitol cocoate, a polyoxyethylene galactitol myristate, a polyoxyethylene galactitol palmitate, a polyoxyethylene galactitol linoleate, a polyoxyethylene galactitol stearate, a polyoxyethylene galactitol isostearate, a polyoxyethylene galactitol-12-hydroxystearate, a polyoxyethylene galactitol oleate, a polyoxyethylene galactitol eicosanoate, a polyoxyethylene galactitol behenate, a polyoxyethylene galactitol lignocerate, a polyoxyethylene anhydrogalactitol laurate, a polyoxyethylene anhydrogalactitol cocoate, a polyoxyethylene anhydrogalactitol myristate, a polyoxyethylene anhydrogalactitol palmitate, a polyoxyethylene anhydrogalactitol linoleate, a polyoxyethylene anhydrogalactitol stearate, a polyoxyethylene anhydrogalactitol isostearate, a polyoxyethylene anhydrogalactitol-12-hydroxystearate, a polyoxyethylene anhydrogalactitol oleate, a polyoxyethylene anhydrogalactitol eicosanoate, a polyoxyethylene anhydrogalactitol behenate, and a polyoxyethylene anhydrogalactitol lignocerate. One kind of those reaction products is used alone, or two or more kinds thereof are used in combination. It should be noted that as one or a plurality of fatty acid ester groups exist in one molecule of each of the reaction products listed above, the term "polyoxyethylene glycerin laurate", for example, is intended to encompass "polyoxyethylene glycerin monolaurate, polyoxyethylene glycerin dilaurate, polyoxyethylene glycerin trilaurate, and the like."

The content of the reaction product (component B) in the polylactic acid resin composition of the present invention falls within the range of preferably 2 to 15 parts by weight, more preferably 3 to 10 parts by weight with respect to 100 parts by weight of the polylactic acid (component A) from such a viewpoint that the composition becomes excellent in impact resistance, productivity at the time of the molding thereof, and the like.

Crystal Nucleating Agent

The fatty acid amide (component C) is used as the crystal nucleating agent in the polylactic acid resin composition of the present invention from the viewpoints of, for example, the moldability, heat resistance, and impact resistance of a polylactic acid resin molded article.

The fatty acid amide (component C) to be used in the present invention may be a fatty acid amide having a hydroxyl group, or may be a fatty acid amide free of any hydroxyl group.

Although the fatty acid amide free of any hydroxyl group is not particularly limited, it is preferred to use, for example, any of: fatty acid monoamides such as caprylic acid amide, capric acid amide, myristic acid amide, palmitic acid amide, lauric acid amide, stearic acid amide, arachidic acid amide, behenic acid amide, lignoceric acid amide, stearic acid monoethanolamide, oleic acid amide, linoleic acid amide, and arachidonic acid amide; and fatty acid bisamides such as ethylenebiscaprylic acid amide, butylenebiscaprylic acid amide, hexamethylenebiscaprylic acid amide, m-xylylenebiscaprylic acid amide, ethylenebiscapric acid amide, butylenebiscapric acid amide, hexamethylenebiscapric acid amide, m-xylylenebiscapric acid amide, ethylenebislauric acid amide, butylenebislauric acid amide, hexamethylenebislauric acid amide, m-xylylenebislauric acid amide, ethylenebisstearic acid amide, butylenebisstearic acid amide, hexamethylenebisstearic acid amide, m-xylylenebisstearic acid amide, ethylenebisarachidic acid amide, butylenebisarachidic acid amide, hexamethylenebisarachidic acid amide, m-xylylenebisarachidic acid amide, ethylenebisbehenic acid amide, butylenebisbehenic acid amide, hexamethylenebisbehenic acid amide, m-xylylenebisbehenic acid amide, ethylenebislignoceric acid amide, butylenebislignoceric acid amide, hexamethylenebislignoceric acid amide, m-xylylenebislignoceric acid amide, ethylenebisoleic acid amide, butylenebisoleic acid amide, hexamethylenebisoleic acid amide, m-xylylenebisoleic acid amide, ethylenebislinoleic acid amide, butylenebislinoleic acid amide, hexamethylenebislinoleic acid amide, m-xylylenebislinoleic acid amide, ethylenebisarachidonic acid amide, butylenebisarachidonic acid amide, hexamethylenebisarachidonic acid amide, and m-xylylenebisarachidonic acid amide, because they may impart excellent impact resistance to the polylactic acid resin composition of the present invention. It should be noted that one kind of those fatty acid amides is used alone, or two or more kinds thereof are used in combination.

In addition, for example, a bisamide compound obtained by causing a fatty acid having 8 to 24 carbon atoms, the fatty acid having a hydroxyl group, and a compound having two amino groups to react with each other is preferably used as the fatty acid amide having a hydroxyl group because the polylactic acid resin composition of the present invention becomes excellent in transparency and the like. It should be noted that a fatty acid corresponding to any one of a saturated fatty acid and an unsaturated fatty acid may be used as the fatty acid, and the fatty acids may be used in combination. Alternatively, the fatty acid may be a mixture of fatty acids transformed from oils and fats. In that case, a mixture whose average number of carbon atoms falls within the range is used.

In addition, specific examples of the fatty acid amide having a hydroxyl group include: hydroxyl group-containing fatty acid monoamides such as 8-hydroxycaprylic acid amide, 10-hydroxylauric acid amide, 10-hydroxycapric acid amide, 11-hydroxymyristic acid amide, 16-hydroxypalmitic acid amide, 12-hydroxystearic acid amide, 2-hydroxyarachidic acid amide, 2-hydroxybehenic acid amide, 2-hydroxylignoceric acid amide, 12-hydroxystearic acid monoethanolamide, 12-hydroxyoleic acid amide, 11-hydroxylinoleic acid amide, and 2-hydroxyarachidonic acid amide; and hydroxyl group-containing fatty acid bisamides such as N,N'-ethylenebis-8-hydroxycapric acid amide, N,N'-butylenebis-8-hydroxycapric acid amide, N,N'-hexamethylenebis-8-hydroxycapric acid amide, N,N'-m-xylylenebis-8-hydroxycapric acid amide, N,N'-ethylenebis-10-hydroxylauric acid amide, N,N'-butylenebis-10-hydroxylauric acid amide, N,N'-hexamethylenebis-10-hydroxylauric acid amide, N,N'-m-xylylenebis-10-hydroxylauric acid amide, N,N'-ethylenebis-11-hydroxymyristic acid amide, N,N'-butylenebis-11-hydroxymyristic acid amide, N,N'-hexamethylenebis-11-hydroxymyristic acid amide, N,N'-m-xylylenebis-11-hydroxymyristic acid amide, N,N'-ethylenebis-16-hydroxypalmitic acid amide, N,N'-butylenebis-16-hydroxypalmitic acid amide, N,N'-hexamethylenebis-16-hydroxypalmitic acid amide, N,N'-m-xylylenebis-16-hydroxypalmitic acid amide, N,N'-ethylenebis-12-hydroxystearic acid amide, N,N'-butylenebis-12-hydroxystearic acid amide, N,N'-hexamethylenebis-12-hydroxystearic acid amide, N,N'-m-xylylenebis-12-hydroxystearic acid amide, N,N'-ethylenebis-2-hydroxyarachidic acid amide, N,N'-butylenebis-2-hydroxyarachidic acid amide, N,N'-hexamethylenebis-2-hydroxyarachidic acid amide, N,N'-m-xylylenebis-2-hydroxyarachidic acid amide, N,N'-ethylenebis-2-hydroxybehenic acid amide, N,N'-butylenebis-2-hydroxybehenic acid amide, N,N'-hexamethylenebis-2-hydroxybehenic acid amide, N,N'-m-xylylenebis-2-hydroxybehenic acid amide, N,N'-ethylenebis-2-hydroxylignoceric acid amide, N,N'-butylenebis-2-hydroxylignoceric acid amide, N,N'-hexamethylenebis-2-hydroxylignoceric acid amide, N,N'-m-xylylenebis-2-hydroxylignoceric acid amide, N,N'-ethylenebis-12-hydroxyoleic acid amide, N,N'-butylenebis-12-hydroxyoleic acid amide, N,N'-hexamethylenebis-12-hydroxyoleic acid amide, N,N'-m-xylylenebis-12-hydroxyoleic acid amide, N,N'-ethylenebis-11-hydroxylinoleic acid amide, N,N'-butylenebis-11-hydroxylinoleic acid amide, N,N'-hexamethylenebis-11-hydroxylinoleic acid amide, N,N'-m-xylylenebis-11-hydroxylinoleic acid amide, N,N'-ethylenebis-11-hydroxyarachidonic acid amide, N,N'-butylenebis-11-hydroxyarachidonic acid amide, N,N'-hexamethylenebis-11-hydroxyarachidonic acid amide, and N,N'-m-xylylenebis-11-hydroxyarachidonic acid amide. One kind of those fatty acid amides is used alone, or two or more kinds thereof are used in combination.

The content of the fatty acid amide (component C) in the polylactic acid resin composition of the present invention falls within the range of preferably 0.1 to 2 parts by weight with respect to 100 parts by weight of the polylactic acid (component A) from such a viewpoint that the composition becomes excellent in productivity at the time of the molding and the like.

Other Resin

In addition to the components (A) to (C), any other resin may be appropriately incorporated into the polylactic acid resin composition of the present invention as long as an effect of the present invention is not impaired (i.e., in the range of less than 20 wt %, preferably 1 to 15 wt %, more preferably 1 to 10 wt % of the whole polylactic acid resin composition). Examples of the other resin include: thermoplastic resins such as a polypropylene, a polystyrene, an ABS resin, an AS resin, a polyphenylene sulfide, a polyetheretherketone, a polyester, a polyacetal, a polysulfone, a polyphenylene oxide, and a polyetherimide; and thermosetting resins such as a phenol resin, a melamine resin, an unsaturated polyester resin, a silicone resin, and an epoxy resin. One kind of those resins is used alone, or two or more kinds thereof are used in combination.

Inorganic Filler

Further, an inorganic filler may be incorporated into the polylactic acid resin composition of the present invention as required. Specific examples of the inorganic filler include talc, clay, mica, zeolite, bentonite, montmorillonite, a glass fiber, and a carbon fiber. One kind of those inorganic fillers is used alone, or two or more kinds thereof are used in combination.

In addition, the content of the inorganic filler in the polylactic acid resin composition of the present invention falls within the range of preferably 0.01 to 2 parts by weight, more preferably 0.01 to 1 part by weight with respect to 100 parts by weight of the polylactic acid (component A) from such a viewpoint that the composition becomes excellent in impact resistance, bending strength, and the like.

Hydrolysis Inhibitor

In addition, a hydrolysis inhibitor may be incorporated into the polylactic acid resin composition of the present invention as required. Examples of the hydrolysis inhibitor include carbodiimide compounds such as a polycarbodiimide compound and a monocarbodiimide compound. Of those, a polycarbodiimide compound is preferred from the viewpoint of the moldability of the polylactic acid resin molded article, and a monocarbodiimide compound is more preferred from the viewpoints of the heat resistance, moldability, flowability, and impact resistance of the polylactic acid resin molded article, and the blooming resistance of the crystal nucleating agent.

Examples of the polycarbodiimide compound include a poly(4,4'-diphenylmethanecarbodiimide), a poly(4,4'-dicyclohexylmethanecarbodiimide), a poly(1,3,5-triisopropylbenzene)polycarbodiimide, and a poly(1,3,5-triisopropylbenzene and 1,5-diisopropylbenzene)polycarbodiimide. The monocarbodiimide compound is, for example, N,N'-di-2,6-diisopropylphenylcarbodiimide.

In addition, the content of the hydrolysis inhibitor in the polylactic acid resin composition of the present invention falls within the range of preferably 0.05 to 2 parts by weight, more preferably 0.1 to 1 part by weight with respect to 100 parts by weight of the polylactic acid (component A) from the viewpoint of the moldability of the polylactic acid resin molded article.

Impact Modifier

In addition, an impact modifier may be incorporated into the polylactic acid resin composition of the present invention as required from the viewpoints of improvements in its physical properties such as flexibility. A (meth)acrylic acid polymer, an ethylene-(meth)acrylic acid copolymer, an ethylene-alkyl (meth)acrylate copolymer, an epoxy-modified silicone acrylic rubber, a copolymer of a diene and a vinyl monomer, and a hydrogenated product thereof, organic fibers such as an aromatic polyamide fiber, a diene rubber, a compatibilizer, and the like can each be used as the impact modifier. It should be noted that the term "(meth)acrylic acid" refers to acrylic acid and/or methacrylic acid.

In addition, the content of the impact modifier in the polylactic acid resin composition of the present invention falls within the range of preferably 1 to 20 parts by weight, more preferably 3 to 10 parts by weight with respect to 100 parts by weight of the polylactic acid (component A) from the viewpoints of the impact resistance and moldability of the resin composition.

The polylactic acid resin composition of the present invention can contain a flame retardant, an antioxidant, a lubricant, an antistatic agent, an anti-fogging agent, a light stabilizer, a UV absorber, a pigment, a colorant, an antifungal agent, an antibacterial agent, a foaming agent, or the like as any other component except the foregoing to such an extent that the achievement of the object of the present invention is not impaired.

Production of Polylactic Acid Resin Composition and Resin Molded Article Thereof The polylactic acid resin composition of the present invention can be prepared by: blending the polylactic acid (component A), the specific reaction product (component B) as a plasticizer, and the fatty acid amide (component C) as a crystal nucleating agent, and as required, any other material at predetermined ratios; and melting and mixing the materials at 160 to 240° C. It should be noted that the melting and mixing may be performed after the respective materials have been blended. Alternatively, the composition may be prepared by the following procedure. After the polylactic acid (component A) has been previously melted with an extruder, a Banbury mixer, a kneader, a heating roll, or the like, the other materials are blended into the molten product and then the mixture is shaped into a uniform pellet shape.

Then, a resin molded article can be obtained by using the resin composition melted and mixed as described above as a material through cast molding, injection molding, blow molding, extrusion molding, or the like. In addition, the composition can be molded into various molded articles by molding methods such as vacuum molding, pressure molding, and vacuum pressure molding after the composition has been processed into a sheet.

When the composition is formed with a mold for obtaining the resin molded article, the temperature of the mold at the time of the molding falls within the range of preferably 40 to 140° C., more preferably 70 to 120° C. from the viewpoint of productivity. In addition, the time period for which the resin molded article is held in the mold in vacuum molding, pressure molding, or vacuum pressure molding is preferably 1 to 15 seconds, more preferably 1 to 10 seconds from the viewpoints of productivity and the like.

In addition, the migration amount of the polylactic acid resin molded article of the present invention was measured in accordance with a migration test method specified in the FCN system concerning a food packaging container of the U.S. Food and Drug Administration (FDA), and then its cumulative estimated daily intake (CEDI) was calculated. Smaller values for the migration amount and the CEDI mean that the migration amount from the molded article is smaller (the molded article is more excellent in migration resistance). The CEDI's of the polylactic acid resin composition of the present invention and the molded article thereof can each be suppressed to less than 1 ppm, preferably less than 0.5 ppm. As described above, their CEDI's are low, and hence the resin composition and the molded article show low migration amounts at the time of their use and can be safely used as food packaging containers. In addition, reductions in physical properties of the resin composition and the molded article are suppressed because their migration amounts are small.

As described above, each of the polylactic acid resin composition of the present invention and the resin molded article thereof is excellent in impact resistance, heat resistance, and the like, and has high biodegradability. Accordingly, the polylactic acid resin composition of the present invention and the resin molded article thereof can be suitably utilized in applications including: various disposable containers (e.g., food containers such as a tray for fresh food, an instant food container, a fast food container, a lunch box, a beverage bottle, and a container for a flavor such as mayonnaise, an agricultural and horticultural container such as a seedling pot, a blister pack container, and a press-through pack container); CD cases; clear file folders; cards such as a credit card; dinnerware such as a spoon and a drinking straw; plastic models; various resin products such as a resin sheet, a resin film, and a resin hose; and textile goods such as a fiber for clothing and a nonwoven fabric. Further, the polylactic acid resin composition of the present invention can be suitably utilized in wider fields than a conventional polylactic acid resin composition is because its impact resistance, heat resistance, and the like have been improved as compared with those of the conventional polylactic acid resin composition.

EXAMPLES

Next, examples are described together with comparative examples. However, the present invention is not limited to these examples.

First, the following materials were prepared prior to the examples and the comparative examples.

Polylactic Acid A-1

Polylactic acid (trade name: 4032D, manufactured by Natureworks LLC)

Plasticizer B-1

Polyoxyethylene sorbitan tristearate (content of oxyethylene group: 48 wt %, SOLGEN TW-65 manufactured by DAI-ICHI KOGYO SEIYAKU CO., LTD.)

Plasticizer B-2

Polyoxyethylene sorbitan tribehenate (content of oxyethylene group: 43 wt %)

Plasticizer B-3

Polyoxyethylene triisostearic acid hardened castor oil (content of oxyethylene group: 34 wt %, trade name: EMALEX RWIS-320, manufactured by NIHON EMULSION Co., Ltd.)

Plasticizer B-4

Polyoxyethylene glycerin triisostearate (content of oxyethylene group: 50 wt %, trade name: EMALEX GWIS-320, manufactured by NIHON EMULSION Co., Ltd.)

Plasticizer B-5

Polyoxyethylene sorbitol tetraoleate (content of oxyethylene group: 52%, trade name: RHEODOL 430V, manufactured by Kao Corporation)

Plasticizer B-6

Polyoxyethylene mannitan tristearate (content of oxyethylene group: 48 wt %)

Plasticizer B-7

Polyoxyethylene sorbitan tristearate (content of oxyethylene group: 31 wt %, prepared by DAI-ICHI KOGYO SEIYAKU CO., LTD.)

Plasticizer B-8

Polyoxyethylene sorbitan tristearate (content of oxyethylene group: 65 wt %)

Plasticizer B-9

Polyoxyethylene glycerin tristearate (content of oxyethylene group: 20 wt %)

Plasticizer B-10

Polyoxyethylene sorbitan tri-12-hydroxystearate (content of oxyethylene group: 48 wt %)

Plasticizer b-1

Ester compound formed of adipic acid, benzyl alcohol, and diethylene glycol monomethyl ether (content of oxyethylene group: 26 wt %, trade name: DAIFATTY-101, manufactured by DAIHACHI CHEMICAL INDUSTRY CO., LTD.)

Plasticizer b-2

Glycerin monostearate (content of oxyethylene group: 0 wt %, trade name: EXCEL S-95, manufactured by Kao Corporation)

Plasticizer b-3

Diester formed of succinic acid and triethylene glycol monomethyl ether (content of oxyethylene group: 43 wt %)

Plasticizer b-4

Polyoxyethylene glycerin tricaprylate (content of oxyethylene group: 20 wt %)

Plasticizer b-5

Fatty acid ester of polyglycerin (content of oxyethylene group: 0 wt %, trade name: CHIRABAZOL VR-05, manufactured by Taiyo Kagaku Co., Ltd.)

Crystal Nucleating Agent C-1

N,N'-Ethylenebisstearic acid amide (trade name: ITOHWAX J-550S, manufactured by ITOH OIL CHEMICALS CO., LTD.)

Crystal Nucleating Agent C-2

N,N'-Ethylenebis-12-hydroxystearic acid amide (trade name: ITOHWAX J-530, manufactured by ITOH OIL CHEMICALS CO., LTD.)

Crystal Nucleating Agent C-3

N,N'-Xylylenebis-12-hydroxystearic acid amide (trade name: ITOHWAX J-700, manufactured by ITOH OIL CHEMICALS CO., LTD.)

Crystal Nucleating Agent C-4

N'-Hydroxyethyl-12-hydroxystearylamide (trade name: ITOHWAX J-420, manufactured by ITOH OIL CHEMICALS CO., LTD.)

Crystal Nucleating Agent c-1

Talc (trade name: MICRO ACE P-6, manufactured by Nippon Talc Co., Ltd.)

Crystal Nucleating Agent c-2

Montmorillonite, in which an ion between layers is substituted by a dioctadecyldimethylammonium ion (trade name: S-BEN W, manufactured by HOJUN CO., LTD.)

Antioxidant D-1

Hindered phenolic antioxidant (trade name: IRGANOX 1076, manufactured by BASF)

Examples 1 to 18 and Comparative Examples 1 to 9

The respective materials were blended at ratios shown in Table 1 to Table 3 below, and then the mixtures were heated and kneaded with a biaxial extruder (KZW20-30MG manufactured by TECHNOVEL CORPORATION) under the condition of a temperature of its cylinder of 160 to 190° C. Thus, pellets of resin compositions were obtained. It should be noted that the pellets were dried under reduced pressure at a temperature of 70° C. for 12 hours or more.

The polylactic acid resin compositions (pellets) of the examples and the comparative examples thus obtained were measured and evaluated for their respective characteristics in accordance with the following criteria. Table 1 to Table 3 below show the results together.

Mold Holding Time

A sheet having a thickness of 0.4 mm was produced from each of the pellets with a T-die extruder (manufactured by TECHNOVEL CORPORATION). After that, the sheet was heated from above and below with an infrared heater at about 300° C. to be softened. Subsequently, the sheet was loaded into a mold with its temperature controlled to 90° C., and was then subjected to vacuum pressure molding, followed by removal from the mold. Thus, a resin molded article was obtained. During the removal from the mold, the shortest time required for the resin molded article to be taken out of the mold without any deformation (mold holding time) was measured. It should be noted that productivity becomes higher as the shortest time shortens.

Heat Resistance

The resin molded article (molded article formed of the polylactic acid resin composition) obtained by such mold forming as described above was loaded into an oven at 90° C. and held for 30 minutes. Then, the molded article was evaluated as ○ when no deformation was observed after the heating, or was evaluated as x when the molded article deformed after the heating.

Impact Resistance

A falling ball impact test was performed by: mounting a point of impact whose tip was of a spherical shape having a diameter of 10 mm on the resin molded article obtained by such mold forming as described above; and dropping a weight having a mass of 300 g or 500 g on the point of impact. Then, the altitude (mm) from which the weight was dropped when the resin molded article cracked was measured. It should be noted that the resin molded article was represented as ">1,000" in the case where the resin molded article did not crack even when the altitude from which the weight was dropped exceeded 1,000 mm, or was represented as "<50" in the case where the resin molded article cracked even when the altitude from which the weight was dropped was less than 50 mm.

CEDI

The migration amount of the resin molded article (molded article formed of the polylactic acid resin composition) obtained by such mold forming as described above was measured in accordance with a migration test method specified in the FCN system of the FDA of America, and then its cumulative estimated daily intake (CEDI) was calculated. It should be noted that in the migration test, 10% ethanol was used as a food simulant, and was heated under the conditions of 66° C. and 2 hours. Then, the migration amount was determined by quantifying a substance migrated in the food simulant through gas chromatography, followed by the calculation of the CEDI (ppm). It should be noted that a smaller value for the CEDI means that the resin molded article is more excellent in migration resistance.

TABLE 1

| | | Part(s) by weight Example | | | | | | | | |
|---|---|---|---|---|---|---|---|---|---|---|
| | | 1 | 2 | 3 | 4 | 5 | 6 | 7 | 8 | 9 |
| Polylactic acid | A-1 | 100 | 100 | 100 | 100 | 100 | 100 | 100 | 100 | 100 |
| Plasticizer | B-1 | 5 | — | — | — | — | — | — | — | — |
| | B-2 | — | 5 | — | — | — | — | — | — | — |
| | B-3 | — | — | 5 | — | — | — | — | — | — |
| | B-4 | — | — | — | 5 | — | — | — | — | — |
| | B-5 | — | — | — | — | 5 | — | — | — | — |
| | B-6 | — | — | — | — | — | 5 | — | — | — |
| | B-7 | — | — | — | — | — | — | 5 | — | — |
| | B-8 | — | — | — | — | — | — | — | 5 | — |
| | B-9 | — | — | — | — | — | — | — | — | 5 |
| | B-10 | — | — | — | — | — | — | — | — | — |
| Crystal nucleating agent | C-1 | 1 | 1 | 1 | 1 | 1 | 1 | 1 | 1 | 1 |
| | C-2 | — | — | — | — | — | — | — | — | — |
| | C-3 | — | — | — | — | — | — | — | — | — |
| | C-4 | — | — | — | — | — | — | — | — | — |
| Antioxidant | D-1 | 0.3 | 0.3 | 0.3 | 0.3 | 0.3 | 0.3 | 0.3 | 0.3 | 0.3 |
| Mold holding time (s) | | 5 | 5 | 5 | 5 | 5 | 5 | 5 | 5 | 5 |
| Heat resistance | | ○ | ○ | ○ | ○ | ○ | ○ | ○ | ○ | ○ |
| Impact resistance (mm) | Weight 300 g | >1,000 | >1,000 | >1,000 | >1,000 | >1,000 | >1,000 | >1,000 | 900 | >1,000 |
| | Weight 500 g | 500 | 550 | 600 | 400 | 400 | 500 | 600 | 400 | >1,000 |
| CEDI (ppm) | | 0.14 | 0.13 | 0.15 | 0.12 | 0.16 | 0.13 | 0.16 | 0.12 | 0.10 |

TABLE 2

| | | Part(s) by weight Example | | | | | | | | |
|---|---|---|---|---|---|---|---|---|---|---|
| | | 10 | 11 | 12 | 13 | 14 | 15 | 16 | 17 | 18 |
| Polylactic acid | A-1 | 100 | 100 | 100 | 100 | 100 | 100 | 100 | 100 | 100 |
| Plasticizer | B-1 | — | 5 | 5 | 5 | 5 | 5 | 3 | 10 | 15 |
| | B-2 | — | — | — | — | — | — | — | — | — |
| | B-3 | — | — | — | — | — | — | — | — | — |
| | B-4 | — | — | — | — | — | — | — | — | — |
| | B-5 | — | — | — | — | — | — | — | — | — |
| | B-6 | — | — | — | — | — | — | — | — | — |
| | B-7 | — | — | — | — | — | — | — | — | — |
| | B-8 | — | — | — | — | — | — | — | — | — |
| | B-9 | — | — | — | — | — | — | — | — | — |
| | B-10 | 5 | — | — | — | — | — | — | — | — |
| Crystal nucleating agent | C-1 | 1 | — | — | — | 0.1 | 2 | 1 | 1 | 1 |
| | C-2 | — | 1 | — | — | — | — | — | — | — |
| | C-3 | — | — | 1 | — | — | — | — | — | — |
| | C-4 | — | — | — | 1 | — | — | — | — | — |
| Antioxidant | D-1 | 0.3 | 0.3 | 0.3 | 0.3 | 0.3 | 0.3 | 0.3 | 0.3 | 0.3 |
| Mold holding time (s) | | 5 | 5 | 5 | 5 | 5 | 5 | 5 | 5 | 5 |
| Heat resistance | | ○ | ○ | ○ | ○ | ○ | ○ | ○ | ○ | ○ |
| Impact resistance (mm) | Weight 300 g | >1,000 | >1,000 | >1,000 | >1,000 | >1,000 | >1,000 | 900 | >1,000 | >1,000 |
| | Weight 500 g | 550 | 500 | 500 | 500 | 500 | 550 | 400 | >1,000 | >1,000 |
| CEDI (ppm) | | 0.13 | 0.13 | 0.13 | 0.13 | 0.13 | 0.13 | 0.10 | 0.23 | 0.34 |

TABLE 3

| | | Part(s) by weight Comparative Example | | | | | | | | |
|---|---|---|---|---|---|---|---|---|---|---|
| | | 1 | 2 | 3 | 4 | 5 | 6 | 7 | 8 | 9 |
| Polylactic acid | A-1 | 100 | 100 | 100 | 100 | 100 | 100 | 100 | 100 | 100 |
| Plasticizer | B-1 | — | — | — | — | — | — | — | 5 | 5 |
| | b-1 | — | 5 | — | — | — | — | — | — | — |
| | b-2 | — | — | 5 | — | — | — | — | — | — |
| | b-3 | — | — | — | 5 | — | — | — | — | — |
| | b-4 | — | — | — | — | 5 | — | — | — | — |
| | b-5 | — | — | — | — | — | 5 | — | — | — |
| Crystal nucleating agent | C-1 | — | 1 | 1 | 1 | 1 | 1 | 1 | — | — |
| | c-1 | — | — | — | — | — | — | — | 1 | — |
| | c-2 | — | — | — | — | — | — | — | — | 1 |
| Antioxidant | D-1 | 0.3 | 0.3 | 0.3 | 0.3 | 0.3 | 0.3 | 0.3 | 0.3 | 0.3 |
| Mold holding time (s) | | 600 | 10 | 25 | 10 | 10 | 15 | 30 | 30 | 30 |
| Heat resistance | | ○ | ○ | ○ | ○ | ○ | ○ | ○ | × | × |
| Impact resistance (mm) | Weight 300 g | 250 | 250 | 250 | 250 | 700 | >1,000 | 250 | 700 | 600 |
| | Weight 500 g | <50 | <50 | <50 | <50 | 200 | 400 | <50 | 150 | 150 |
| CEDI (ppm) | | 0.01 | 1.71 | 3.44 | 3.24 | 1.13 | 0.25 | 0.01 | 0.13 | 0.13 |

As can be seen from the results of Table 1 to Table 3, the polylactic acid resin compositions of the examples each had high productivity because their mold holding times were shorter than those of the polylactic acid resin compositions of the comparative examples. Further, the polylactic acid resin compositions of the examples were each excellent in heat resistance because none of the resin molded articles thereof showed deformation due to heating. In addition, the polylactic acid resin compositions of the examples were each superior in impact resistance to the polylactic acid resin compositions of the comparative examples.

The polylactic acid resin composition of the present invention and the resin molded article thereof can be suitably utilized in applications including: various disposable containers (e.g., food containers such as a tray for fresh food, an instant food container, a fast food container, a lunch box, a beverage bottle, and a container for a flavor such as mayonnaise, an agricultural and horticultural container such as a seedling pot, a blister pack container, and a press-through pack container); CD cases; clear file folders; cards such as a credit card; dinnerware such as a spoon and a drinking straw; plastic models; various resin products such as a resin sheet, a resin film, and a resin hose; and textile goods such as a fiber for clothing and a nonwoven fabric. Further, the polylactic acid resin composition of the present invention can be suitably utilized in wider fields than a conventional polylactic acid resin composition is because its impact resistance, heat resistance, and the like have been improved as compared with those of the conventional polylactic acid resin composition.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A polylactic acid resin composition comprising:
   (i) a polylactic acid;
   (ii) a reaction product of:
      at least one of a polyol and a polyol dehydration condensate selected from the group consisting of glycerin, erythritol, pentaerythritol, xylitol, sorbitol, mannitol, galactitol, and maltitol,
      an alkylene oxide comprising ethylene oxide, wherein said ethylene oxide accounts for over half of said alkylene oxide, and
      a fatty acid having 12 to 24 carbon atoms; and
   (iii) a fatty acid amide,
   wherein a content of the reaction product (ii) falls within a range of 2 to 15 parts by weight with respect to 100 parts by weight of the polylactic acid (i),
   wherein a content of the fatty acid amide (iii) falls within a range of 0.1 to 2 parts by weight with respect to 100 parts by weight of the polylactic acid (i),
   wherein the reaction product (ii) contains 20 to 95 wt % of an oxyethylene group, and contains in more than 2 and less than or equal to 9 ester group on average in a molecule thereof,
   wherein the fatty acid amide (iii) is selected from the group consisting of fatty acid monoamides, fatty acid bisamides, hydroxyl group-containing fatty acid monoamides, hydroxyl group-containing fatty acid bisamides, and
   wherein the fatty acid amide (iii) is derived from a fatty acid having 8 to 24 carbon atoms.

2. The polylactic acid resin composition according to claim 1, wherein the fatty acid amide (iii) is at least one of the hydroxyl group-containing fatty acid monoamides and the hydroxyl group-containing fatty acid bisamides.

3. The polylactic acid resin composition according to claim 1, wherein said alkylene oxide is entirely formed of said ethylene oxide.

4. A resin molded article comprising a polylactic acid resin composition comprising:

(i) a polylactic acid;
(ii) a reaction product of:
   at least one of a polyol and a polyol dehydration condensate selected from the group consisting of glycerin, erythritol, pentaerythritol, xylitol, sorbitol, mannitol, galactitol, and maltitol,
   an alkylene oxide comprising ethylene oxide, wherein said ethylene oxide accounts for over half of said alkylene oxide, and
   a fatty acid having 12 to 24 carbon atoms; and
(iii) a fatty acid amide,
wherein a content of the reaction product (ii) falls within a range of 2 to 15 parts by weight with respect to 100 parts by weight of the polylactic acid (i),
wherein a content of the fatty acid amide (iii) falls within a range of 0.1 to 2 parts by weight with respect to 100 parts by weight of the polylactic acid (i),
wherein the reaction product (ii) contains 20 to 95 wt % of an oxyethylene group, and contains more than 2 and less than or equal to 9 ester group on average in a molecule thereof,
wherein the fatty acid amide (iii) is selected from the group consisting of fatty acid monoamides, fatty acid bisamides, hydroxyl group-containing fatty acid monoamides, hydroxyl group-containing fatty acid bisamides, and
wherein the fatty acid amide (iii) is derived from a fatty acid having 8 to 24 carbon atoms.

5. The resin molded article according to claim 4, wherein the fatty acid amide (iii) is at least one of the hydroxyl group-containing fatty acid monoamides and the hydroxyl group-containing fatty acid bisamides.

6. The resin molded article according to claim 4, wherein said alkylene oxide is entirely formed of said ethylene oxide.

7. The polylactic acid resin composition according to claim 1,
wherein an impact resistance of the composition having a thickness of 0.4 mm, measured with a weight of 300 g, is ≥900 mm,
wherein the resin composition is free from deformation when being loaded into an oven at 90° C. and held for 30 minutes,
wherein a cumulative estimated daily intake (CEDI) value of the composition in which 10% ethanol is used as a simulant solvent, subjected to heat at 66° C. for 2 hours, is suppressed to less than 1 ppm, and
wherein a mold holding time of the composition having a thickness of 0.4 mm, subjected to heat at 300° C. and loading into a mold at 90° C., is 1 to 10 seconds.

8. The resin molded article according to claim 4,
wherein an impact resistance of the composition having a thickness of 0.4 mm, measured with a weight of 300 g, is ≥900 mm,
wherein the resin composition is free from deformation when being loaded into an oven at 90° C. and held for 30 minutes,
wherein a cumulative estimated daily intake (CEDI) value of the composition in which 10% ethanol is used as a simulant solvent, subjected to heat at 66° C. for 2 hours, is suppressed to less than 1 ppm, and
wherein a mold holding time of the composition having a thickness of 0.4 mm, subjected to heat at 300° C. and loading into a mold at 90° C., is 1 to 10 seconds.

\* \* \* \* \*